US008836875B2

(12) United States Patent
Ohyama et al.

(10) Patent No.: US 8,836,875 B2
(45) Date of Patent: Sep. 16, 2014

(54) LIQUID CRYSTAL DISPLAY DEVICE AND ELECTRONIC APPARATUS

(71) Applicant: Japan Display West, Inc., Aichi-Ken (JP)

(72) Inventors: Tsuyoshi Ohyama, Tokyo (JP); Yingbao Yang, Kanagawa (JP); Takeo Koito, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 81 days.

(21) Appl. No.: 13/683,176

(22) Filed: Nov. 21, 2012

(65) Prior Publication Data

US 2013/0148044 A1 Jun. 13, 2013

(30) Foreign Application Priority Data

Dec. 13, 2011 (JP) ................................. 2011-271941

(51) Int. Cl.
*G02F 1/1335* (2006.01)
*G02F 1/1343* (2006.01)
*G02B 27/22* (2006.01)

(52) U.S. Cl.
CPC ................................. *G02B 27/2214* (2013.01)
USPC .............. 349/15; 349/144; 349/146; 349/141

(58) Field of Classification Search
CPC .... G02B 27/2214; G02B 27/26; G02B 27/22; G02B 27/225; G02B 27/2257; H04N 13/0409; H04N 13/0404; H04N 13/0411; G02F 1/134363; G02F 1/133707; G02F 1/136213; G02F 1/1393; G02F 2001/134345
USPC ..................................... 349/15, 144, 146, 141
See application file for complete search history.

(56) References Cited

U.S. PATENT DOCUMENTS

| 7,002,642 B2* | 2/2006 | Jung ................................. 349/15 |
| 7,066,599 B2* | 6/2006 | Hattori et al. ...................... 353/7 |
| 7,245,430 B2* | 7/2007 | Kobayashi et al. ........... 359/464 |
| 7,265,902 B2* | 9/2007 | Lee et al. ....................... 359/463 |
| 2007/0159566 A1 | 7/2007 | Kang |

FOREIGN PATENT DOCUMENTS

| JP | 09-197344 | 7/1997 |
| JP | 2008-051846 A | 3/2008 |
| JP | 2008-203708 A | 9/2008 |
| JP | 2008-233851 A | 10/2008 |
| JP | 2009-53473 | 3/2009 |
| JP | 2011-169949 A | 9/2011 |

OTHER PUBLICATIONS

Japanese Office Action issued Apr. 30, 2014 for corresponding Japanese Application No. 2011-271941.

* cited by examiner

*Primary Examiner* — Mike Qi
(74) *Attorney, Agent, or Firm* — Rader, Fishman & Grauer PLLC

(57) ABSTRACT

A liquid crystal display device includes a liquid crystal panel which displays a left eye image and a right eye image; and a light-shielding barrier which has a slit section and a light-shielding section to cause binocular parallax, wherein the liquid crystal panel includes a first substrate which has a pixel electrode formed thereon, a second substrate which is separated from and opposed to the surface of the first substrate which has the pixel electrode formed thereon, and a liquid crystal layer which is disposed between the first substrate and the second substrate, the pixel electrode has a plurality of strip-shaped parts which are arranged with intervals therebetween, and an extending direction of the strip-shaped parts is substantially perpendicular to an opening direction of the slit section.

5 Claims, 15 Drawing Sheets

106

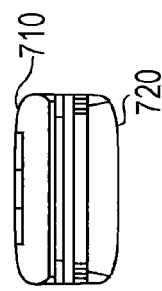
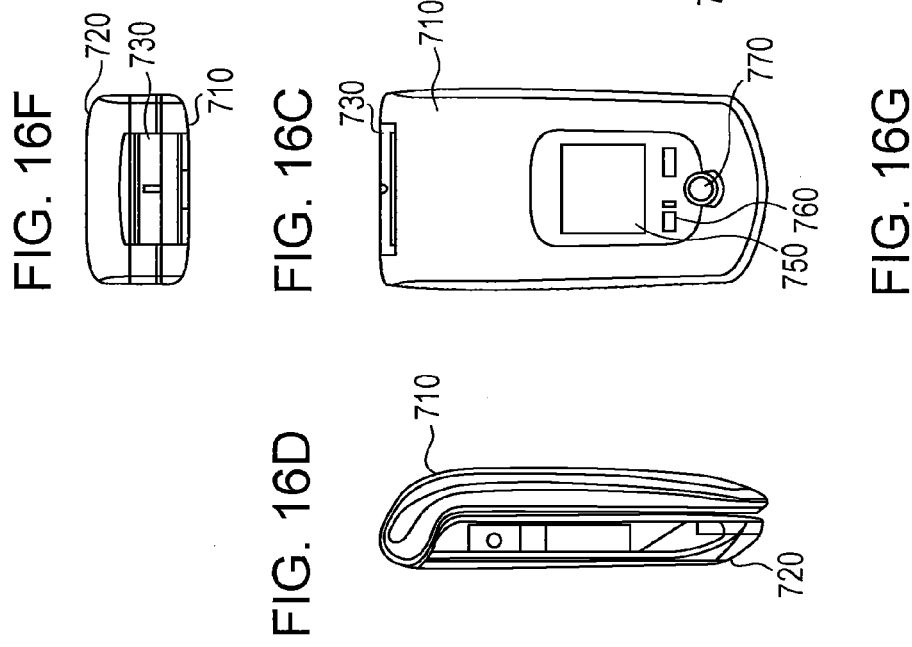
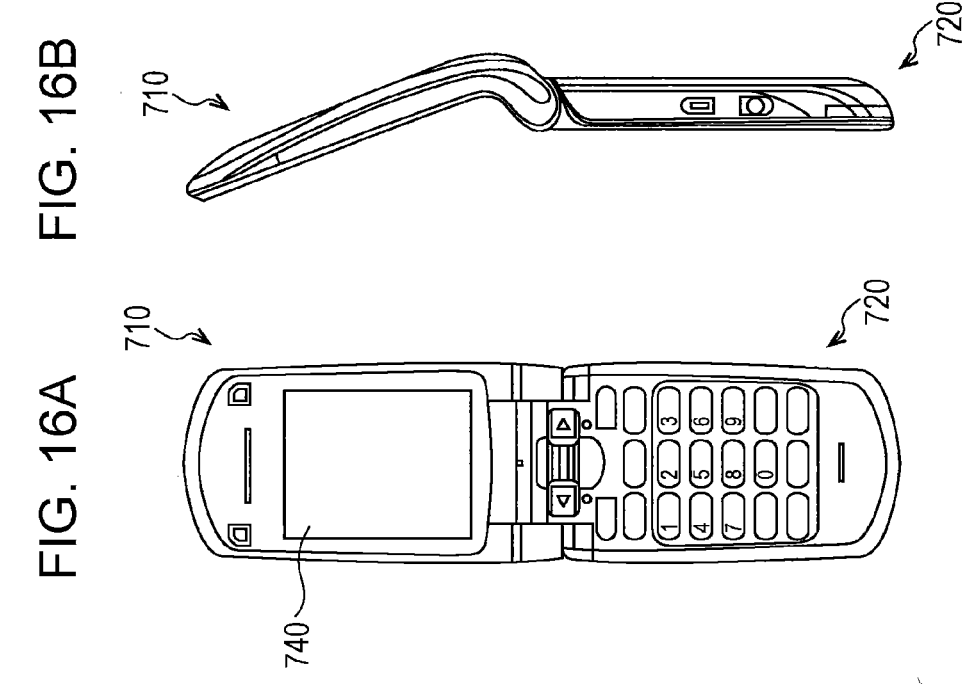

LIQUID CRYSTAL DISPLAY DEVICE AND ELECTRONIC APPARATUS

BACKGROUND

The present disclosure relates to a liquid crystal display device and an electronic apparatus, and particularly to a liquid crystal display device and an electronic apparatus in which crosstalk can be suppressed from occurring in the display of a 3D image.

Hitherto, display devices have been known which display a 3D image through a parallax barrier method, a lenticular lens method, or the like without necessary for a pair of special spectacles.

Among the display devices, in a display device which displays a 3D image through a parallax barrier method, the arrival angle range of diffracted light rays is uniformized in order to avoid a preferred viewing distance from being reduced due to the diffraction at the opening of a parallax barrier (for example, see Japanese Unexamined Patent Application Publication No. 2009-53473).

SUMMARY

However, for example, in a Fringe Field Switching (FFS)-mode liquid crystal display device, the liquid crystal for each pixel acts as a liquid crystal phase diffraction grating in accordance with the alignment of the liquid crystal determined by a comb teeth-shaped pixel electrode and the slit pitch of the pixel electrode, and thus so-called crosstalk easily occurs in which a right eye image and a left eye image are observed at the same time by at least any one of the eyes.

Particularly, in the related art, in the comb teeth-shaped pixel electrode, the comb teeth are formed to extend in the longitudinal direction of a rectangular pixel area. Accordingly, when the rectangular pixel area is in a portrait (vertically longer) state, the slit direction of the pixel electrode becomes parallel to the opening direction of a parallax barrier (both of the directions are vertical directions), and thus there is concern that the influence of the crosstalk due to the liquid crystal phase diffraction grating increases.

It is desirable to suppress crosstalk from occurring in the display of a 3D image.

According to an embodiment of the present disclosure, there is provided a liquid crystal display device including a liquid crystal panel which displays a left eye image and a right eye image; and a light-shielding barrier which has a slit section and a light-shielding section to cause binocular parallax, in which the liquid crystal panel includes a first substrate which has a pixel electrode formed thereon, a second substrate which is separated from and opposed to the surface of the first substrate which has the pixel electrode formed thereon, and a liquid crystal layer which is disposed between the first substrate and the second substrate, the pixel electrode has a plurality of strip-shaped parts which are arranged with intervals therebetween, and an extending direction of the strip-shaped parts is substantially perpendicular to an opening direction of the slit section.

In the display of an image, when a rectangular pixel area is vertically longer, the strip-shaped parts of the pixel electrode may extend in a transverse direction of the rectangular shape.

A barrier driving section which forms the stripe slit section and the stripe light-shielding section in the light-shielding barrier, and drives the light-shielding barrier to move the position of the light-shielding section in the light-shielding barrier in accordance with the position of an observer; and a backlight which makes light rays for displaying the left eye image and the right eye image incident on the liquid crystal panel may be further provided, and the light-shielding barrier may be disposed between the liquid crystal panel and the backlight.

In the display of an image, the rectangular pixel area may be horizontally longer, and the strip-shaped parts of the pixel electrode may extend in a longitudinal direction of the rectangular shape.

According to another embodiment of the present disclosure, there is provided an electronic apparatus including a liquid crystal display device which performs display on the basis of an image signal; and a processor which generates the image signal through a predetermined process, in which the liquid crystal display device includes a liquid crystal panel which displays a left eye image and a right eye image, and a light-shielding barrier which has a slit section and a light-shielding section to cause binocular parallax, the liquid crystal panel includes a first substrate which has a pixel electrode formed thereon, a second substrate which is separated from and opposed to the surface of the first substrate which has the pixel electrode formed thereon, and a liquid crystal layer which is disposed between the first substrate and the second substrate, the pixel electrode has a plurality of strip-shaped parts which are arranged with intervals therebetween, and an extending direction of the strip-shaped parts is substantially perpendicular to an opening direction of the slit section.

According to the embodiments of the present disclosure, the first substrate which has the pixel electrode formed thereon, the second substrate which is separated from and opposed to the surface of the first substrate which has the pixel electrode formed thereon, and the liquid crystal layer which is disposed between the first substrate and the second substrate are provided, the pixel electrode has the plurality of strip-shaped parts which are arranged with intervals therebetween, and the extending direction of the strip-shaped parts is substantially perpendicular to the opening direction of the slit section.

According to the embodiments of the present disclosure, it is possible to suppress crosstalk from occurring in the display of a 3D image.

BRIEF DESCRIPTION OF THE DRAWINGS

FIGS. 16A to 16G are diagrams illustrating an example of the application to an electronic apparatus of the present disclosure.

DETAILED DESCRIPTION OF EMBODIMENTS

Hereinafter, embodiments of the present disclosure will be described with reference to the drawings. The description will proceed in the following order.

1. First Embodiment
2. Second Embodiment
3. Examples of Application to Electronic Apparatus

1. First Embodiment

Examples of Configuration of 3D Image Display Device

Figure 1:
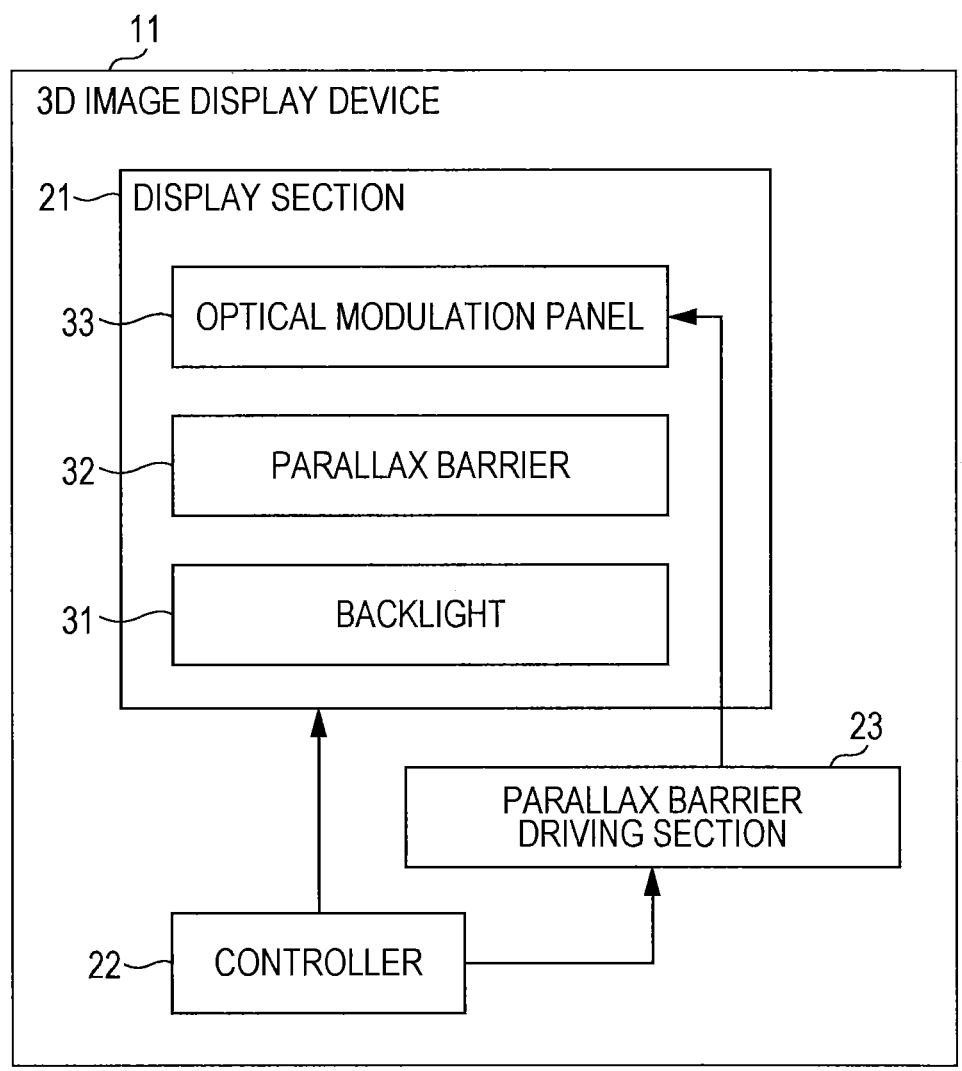
FIG. 1 is a diagram showing an example of the configuration of an embodiment of a 3D image display device to which the present disclosure is applied.

FIG. 1 is a diagram showing an example of the configuration of an embodiment of a 3D image display device to which the present disclosure is applied.

A 3D image display device 11 displays a 3D image and a 2D image while performing switching between the display of a three-dimensional image through a parallax barrier method and the display of a two-dimensional image as necessary. The 3D image display device 11 has a display section 21, a controller 22, and a parallax barrier driving section 23.

The display section 21 is formed of a backlight 31, a parallax barrier 32, and an optical modulation panel 33, and displays a three-dimensional image formed of a right eye image which is observed (perceived) by the right eye of an observer and a left eye image which is observed by the left eye of the observer, and a two-dimensional image.

That is, the backlight 31 is a dedicated lighting device for image display which is formed of a light guide plate, a light source such as a Light Emitting Diode (LED), a reflecting sheet, and the like, and emits light rays for displaying an image to make the light rays incident on the optical modulation panel 33 via the parallax barrier 32.

The parallax barrier 32 is formed of a polarizing plate, a switch liquid crystal layer, and the like, and in the display of a 3D image, the parallax barrier 32 blocks some of light rays incident from the backlight 31 and transmits some of the remaining incident light rays, thereby optically separating a right eye image and a left eye image. In addition, in the display of a 2D image, the parallax barrier 32 transmits light rays incident from the backlight 31 as they are.

The optical modulation panel 33 is a liquid crystal display panel formed of color filters for R, G, and B colors, a liquid crystal layer, a polarizing plate, a thin-film transistor, and the like, and transmits light rays incident from the parallax barrier 32 to display an image. At this time, the optical modulation panel 33 changes the optical transmittance for each pixel provided in the optical modulation panel 33 to perform gradation display of the pixels of the image.

The controller 22 controls the sections in the 3D image display device 11, that is, the display section 21 and the parallax barrier driving section 23. For example, the controller 22 drives a display driver (not shown) of the display section 21 to display an image on the optical modulation panel 33 or to emit light rays from the backlight 31.

The parallax barrier driving section 23 drives the parallax barrier 32 in accordance with the control of the controller 22 to block some of light rays incident on the optical modulation panel 33 from the backlight 31, thereby separating a right eye image and a left eye image. Specifically, the parallax barrier driving section 23 forms slit areas transmitting light rays and light-shielding areas blocking light rays in the parallax barrier 32.

Examples of Configuration of Display Section

Next, examples of the configuration of the display section 21 of FIG. 1 will be described in detail with reference to FIG. 2. In the display section 21 of FIG. 2, parts corresponding to the parts in the display section 21 of FIG. 1 will be denoted by the same reference symbols, and descriptions thereof will be appropriately omitted. In addition, in FIG. 2, the transverse direction, the depth direction, and the longitudinal direction are set as an x direction, a y direction, and a z direction, respectively.

Figure 2:
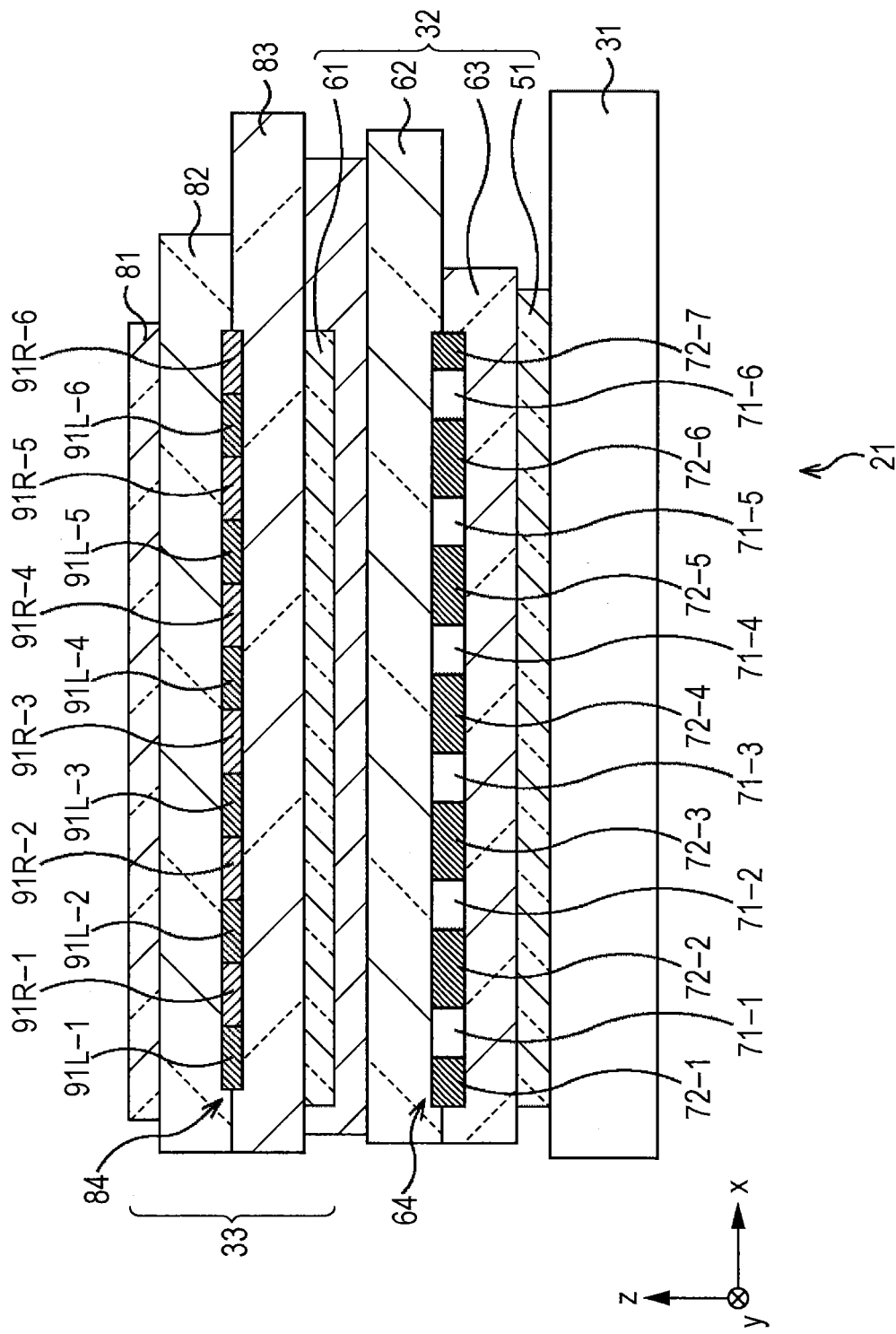
FIG. 2 is a diagram showing an example of the configuration of a display section.

In the display section 21 shown in FIG. 2, although the parallax barrier 32 is disposed between the backlight 31 and the optical modulation panel 33, the optical modulation panel 33 may be disposed between the backlight 31 and the parallax barrier 32.

In FIG. 2, the parallax barrier 32 has a polarizing plate 51, a polarizing plate 61, a transparent substrate 62, a transparent substrate 63, and a switch liquid crystal layer 64. In FIG. 2, the polarizing plate 61 is used as a constituent member for the parallax barrier 32, and also used as a constituent member for the optical modulation panel 33.

In the parallax barrier 32, the flat plate-shaped transparent substrate 62 and the flat plate-shaped transparent substrate 63 are provided opposed to each other between the polarizing plate 51 and the polarizing plate 61 which are disposed opposed to each other. In addition, the switch liquid crystal layer 64 is formed between the transparent substrate 62 and the transparent substrate 63.

Electrodes are formed on the surfaces of the transparent substrate 62 and the transparent substrate 63 on the side of the switch liquid crystal layer 64. When a voltage is applied to some or all of the electrodes, the alignment direction of liquid crystal molecules in the switch liquid crystal layer 64 is changed. Accordingly, a parallax barrier is formed in the switch liquid crystal layer 64.

In the example of FIG. 2, a parallax barrier which is formed of slit areas 71-1 to 71-6 transmitting light rays incident from the backlight 31 and light-shielding areas 72-1 to 72-7 blocking light rays incident from the backlight 31 is formed in the switch liquid crystal layer 64.

Hereinafter, when it is not necessary to distinguish the slit areas 71-1 to 71-6 individually, these will be simply referred to as the slit areas 71, and when it is not necessary to distinguish the light-shielding areas 72-1 to 72-7 individually, these will be simply referred to as the light-shielding areas 72.

In the display section 21, in the display of a 3D image, a voltage is applied to the electrodes of the transparent substrate 62 and the transparent substrate 63, and thus a parallax barrier is formed in the switch liquid crystal layer 64. In this case, among light rays emitted from the backlight 31 and subjected to linear polarization by the polarizing plate 51, light rays incident on the slit areas 71 pass through the slit areas 71 and the polarizing plate 61 as they are. Among light rays emitted from the backlight 31 and subjected to linear polarization by the polarizing plate 51, light rays incident on the light-shielding areas 72 are absorbed by the light-shielding areas 72 and are not emitted from the parallax barrier 32.

In addition, in the display section 21, in the display of a 2D image, no voltage is applied to the transparent substrate 62 and the transparent substrate 63, and no parallax barrier is formed in the switch liquid crystal layer 64. That is, the entire area of the switch liquid crystal layer 64 is in the same state as the slit areas 71. In this case, all of the light rays incident from the backlight 31 pass through the parallax barrier 32 and are incident on the optical modulation panel 33.

The optical modulation panel 33 has the polarizing plate 61, a polarizing plate 81, an opposing substrate 82, a Thin Film Transistor (TFT) substrate 83, and a liquid crystal layer 84.

That is, the flat plate-shaped opposing substrate 82 and the flat plate-shaped TFT substrate 83 are provided opposed to each other between the polarizing plate 61 and the polarizing plate 81 which are disposed opposed to each other. In addition, the liquid crystal layer 84 is formed between the opposing substrate 82 and the TFT substrate 83.

A color filter is provided for each pixel on the surface of the opposing substrate 82 on the side of the liquid crystal layer 84. Specifically, color filters for R, G, and B colors are provided in areas of the pixels of the opposing substrate 82. In addition, a common electrode, a pixel electrode, and a Thin Film Transistor (TFT) as a driving element are provided for each pixel on the surface of the TFT substrate 83 on the side of the liquid crystal layer 84.

The liquid crystal layer 84 is provided with transmitting sections 91L-1 to 91L-6 transmitting light rays for displaying a left eye image in the display of a 3D image, and transmitting sections 91R-1 to 91R-6 transmitting light rays for displaying a right eye image in the display of a 3D image. In the optical modulation panel 33, one transmitting section is provided for each of the pixels arranged in a matrix.

In the display of a 3D image or a 2D image, when a voltage is applied to the common electrode and the pixel electrode of the TFT substrate 83 by control of the controller 22, the alignment direction of liquid crystal molecules enclosed in the transmitting sections 91L-1 to transmitting sections 91R-6 is changed in accordance with the magnitude of the voltage. Accordingly, the transmittance of the light rays incident on the optical modulation panel 33 via the parallax barrier 32 from the backlight 31 is changed, and the intensities of the light rays passing through the respective pixels are light intensities corresponding to the pixel values of the pixels of images which are displayed on the pixels.

Hereinafter, when it is not necessary to distinguish the transmitting sections 91L-1 to 91L-6 individually, these will be simply referred to as the transmitting sections 91L, and when it is not necessary to distinguish the transmitting sections 91R-1 to 91R-6 individually, these will be simply referred to as the transmitting sections 91R. In addition, when it is not particularly necessary to distinguish the transmitting sections 91L and the transmitting sections 91R, these will also be simply referred to as the transmitting sections 91.

In the optical modulation panel 33, the transmitting sections 91L and the transmitting sections 91R are alternately provided in the x direction on the x-y plane. Either the transmitting sections 91L or the transmitting sections 91R are continuously arranged in the y direction.

Accordingly, in the display of a 3D image, rectangular areas for a left eye image which constitutes the 3D image and rectangular areas for a right eye image which constitutes the 3D image are alternately arranged and displayed in the x direction on the optical modulation panel 33. In addition, light rays passing through one pixel, that is, one transmitting section 91 are light rays displaying one pixel on the image.

Here, the left eye image and the right eye image which constitute the 3D image are images having parallax therebetween. The x direction in FIG. 2 is a direction of the parallax between the left eye image and the right eye image (parallax direction), that is, a direction in which the right and left eyes of the observer are arranged.

In addition, in the display of a two-dimensional image, the respective transmitting sections 91 transmit light rays for displaying a 2D image which are incident from the backlight 31 via the parallax barrier 32, and make the light rays incident on the eyes of the observer.

Structure of Optical Modulation Panel

Figure 3:
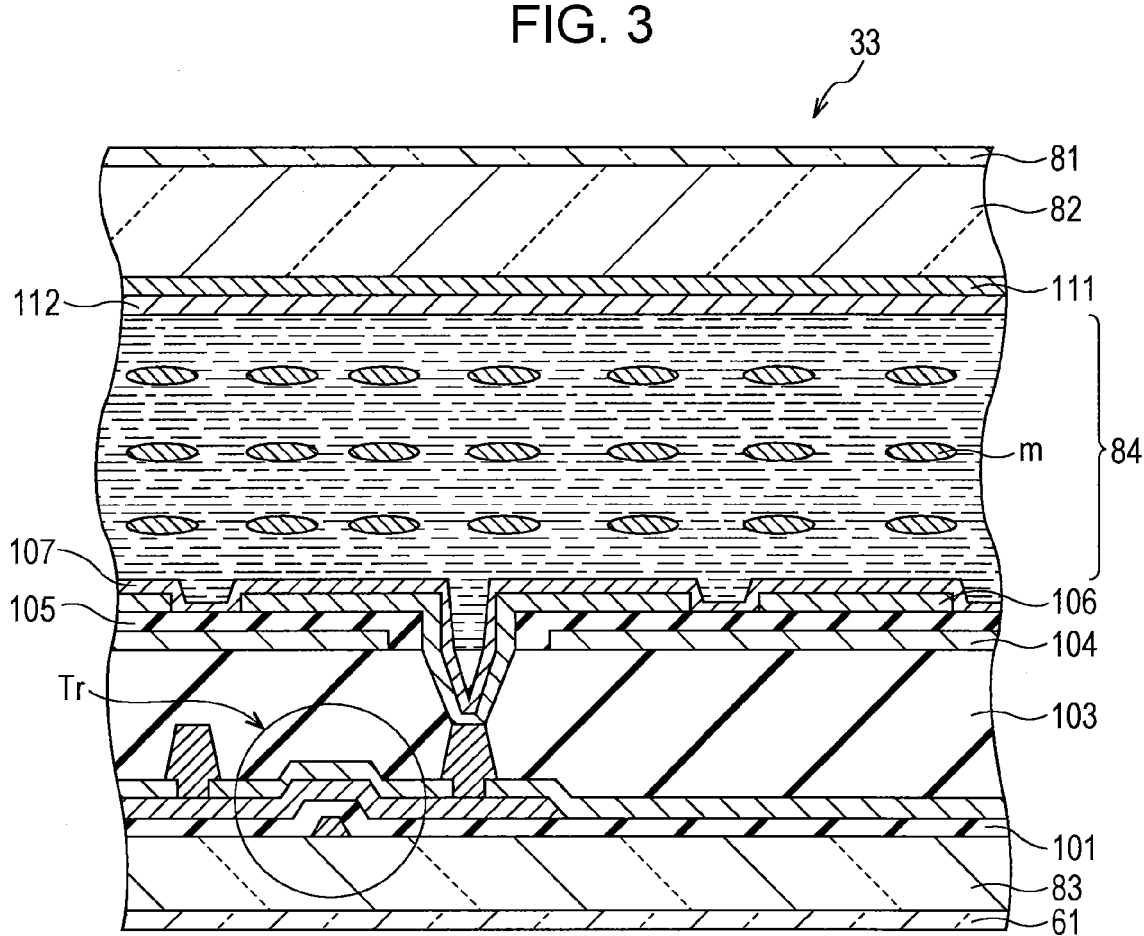
FIG. 3 is a cross-sectional view showing the structure of an optical modulation panel.

Next, the structure of the optical modulation panel 33 of FIG. 2 will be described in detail with reference to FIG. 3. FIG. 3 shows a cross-sectional view for one pixel, of the optical modulation panel 33. In the optical modulation panel 33 of FIG. 3, parts corresponding to the parts in the optical modulation panel 33 of FIG. 2 will be denoted by the same reference symbols, and descriptions thereof will be appropriately omitted.

As shown in FIG. 3, three insulating films 101 to 103, a common electrode 104, an insulating film 105, a pixel electrode 106, and an alignment film 107 are sequentially formed on the surface of the TFT substrate 83 which comes into contact with the liquid crystal layer 84. The common electrode 104 is formed of, for example, a transparent conductive material such as ITO, and is formed over one surface of the insulating film 103. The pixel electrode 106 is also formed of, for example, a transparent conductive material such as ITO. In addition, the polarizing plate 61 is formed on the opposite surface of the TFT substrate 83.

In addition, as shown in FIG. 3, a color filter 111 and an alignment film 112 are sequentially formed on the surface of the opposing substrate 82 which comes into contact with the liquid crystal layer 84. The color filter 111 is formed by periodically arranging color filters for three colors of R, G, and B. In addition, the polarizing plate 81 is formed on the opposite surface of the opposing substrate 82.

The liquid crystal layer 84 modulates passing light rays in accordance with the state of the electric field, and gives a potential difference between the common electrode 104 and the pixel electrode 106 to generate an electric field (lateral electric field) which is parallel to the TFT substrate 83 and change the alignment direction of liquid crystal molecules m. That is, the optical modulation panel 33 performs display in FFS mode.

In addition, although detailed description is omitted, a thin-film transistor Tr is formed on the same layer as the insulating films 101 to 103 as shown in FIG. 3.

Structure of Pixel Electrode

Here, the shape of the pixel electrode will be described.

Figure 4:
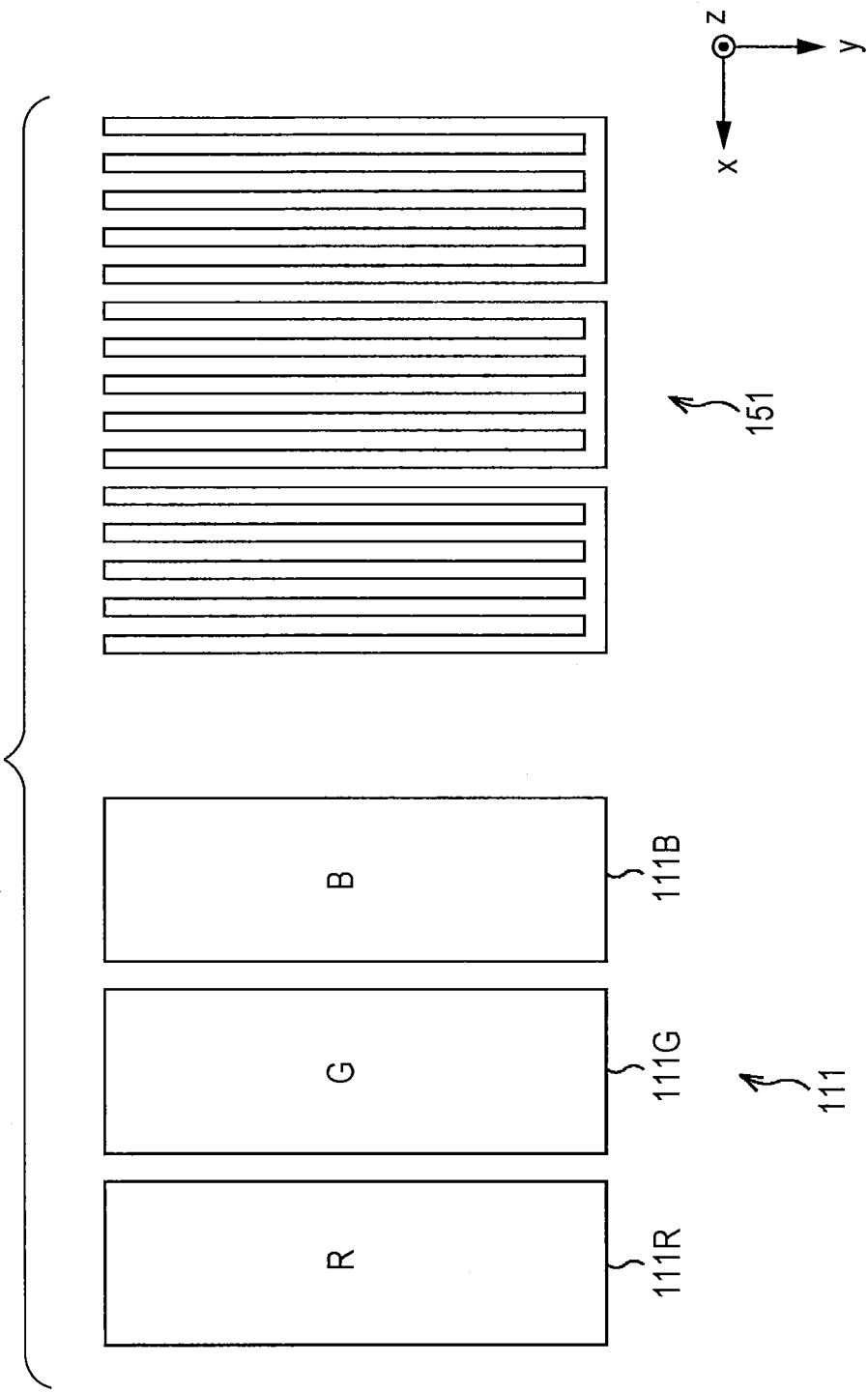
FIG. 4 is a diagram illustrating the shape of a pixel electrode of the related art.

A color filter 111 corresponding to one pixel is shown in the left part of FIG. 4. The color filter 111 of FIG. 4 has a color filter 111R which transmits only red (R) light rays, a color filter 111G which transmits only green (G) light rays, and a color filter 111B which transmits only blue (B) light rays.

That is, in this embodiment, one pixel has three sub-pixels corresponding to the color filters 111R, 111G, and 111B for three colors. The respective sub-pixels are arranged in a stripe arrangement pattern in which the sub-pixels are arranged in stripes, and in the display of an image, the rectangular pixel area is in a portrait (vertically longer) state which is long in the y direction.

A pixel electrode 151 of the related art in a liquid crystal display panel which performs display in FFS mode is shown in the right part of FIG. 4. The pixel electrode 151 is formed in units of sub-pixels, and formed into a comb teeth shape. In the comb teeth-shaped pixel electrode 151, the comb teeth are formed parallel to the opening direction of the parallax barrier, that is, the y direction.

In this case, phase diffraction occurs in a direction perpendicular to the opening direction of the parallax barrier, and crosstalk occurs in the display of a 3D image.

Figure 5:
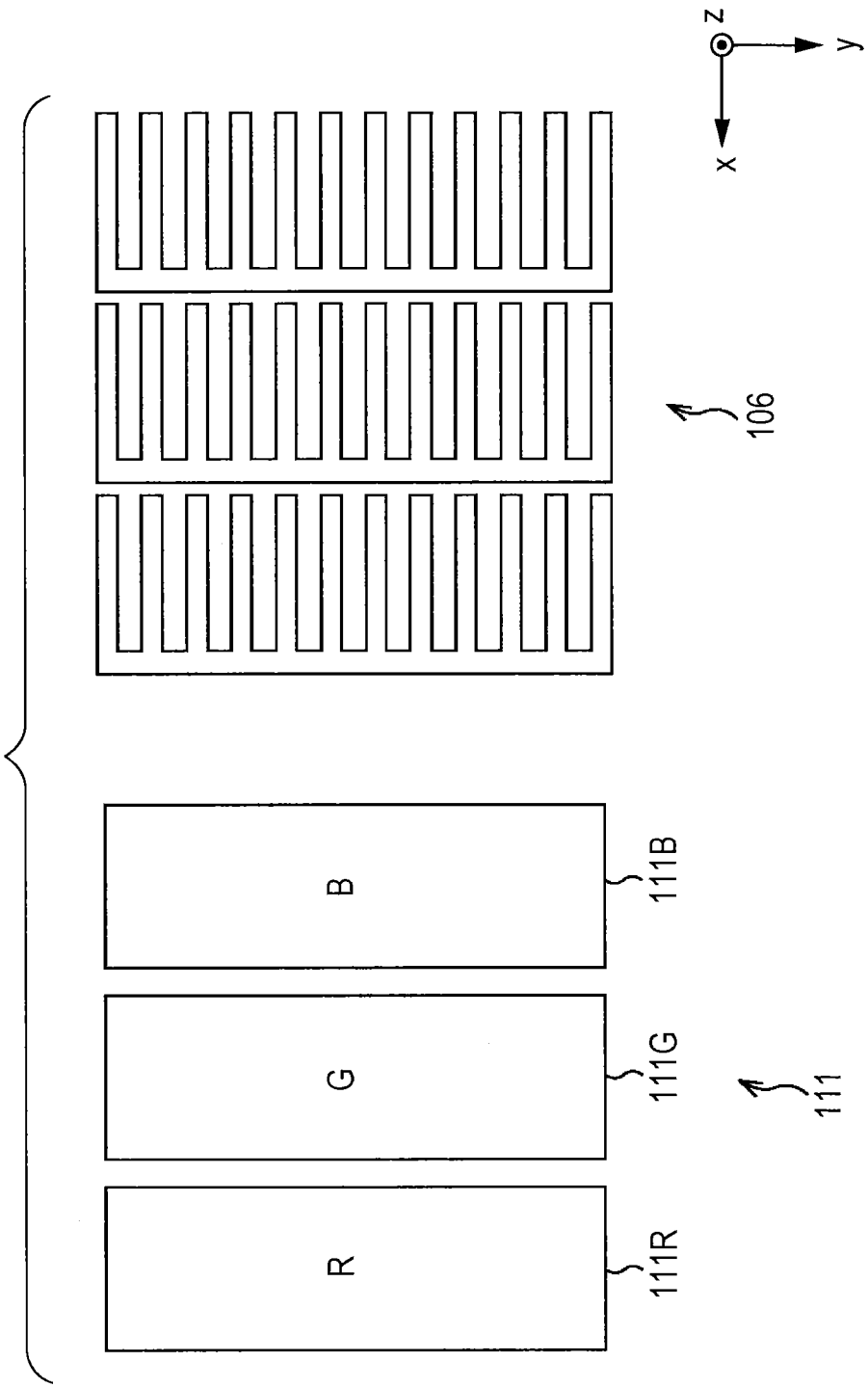
FIG. 5 is a diagram illustrating the shape of a pixel electrode of the present disclosure.

FIG. 5 shows a color filter 111 corresponding to one pixel and a pixel electrode 106 of this embodiment. The color filter 111 shown in the left part of FIG. 5 is the same as the color filter 111 illustrated in FIG. 4, and the description thereof will be omitted.

The pixel electrode 106 shown in the right part of FIG. 5 is also formed in units of sub-pixels and also formed into a comb teeth shape. In the comb teeth-shaped pixel electrode 106, the comb teeth are formed parallel to the parallax direction, that is, the x direction. In other words, each pixel electrode 106 has a plurality of strip-shaped parts which are arranged with intervals therebetween, and the extending direction of the strip-shaped parts is perpendicular to the opening direction of the parallax barrier. That is, the strip-shaped part of the pixel electrode is formed to extend in the transverse direction of the rectangular pixel area.

According to the above-described configuration, even when the liquid crystal for each pixel acts as a liquid crystal phase diffraction grating in accordance with the alignment of the liquid crystal determined by a comb teeth-shaped pixel electrode and the slit pitch of the pixel electrode, the slit direction of the pixel electrode and the opening direction of the parallax barrier are perpendicular to each other. Accordingly, in the opening direction of the parallax barrier, light rays incident on the pixels from the parallax barrier do not come close to parallel light rays parallel to the slit direction of the pixel electrode. That is, since the liquid crystal for each pixel does not act as a liquid crystal phase diffraction grating in the direction perpendicular to the slit direction of the pixel electrode, it is possible to suppress crosstalk from occurring in the display of a 3D image without being significantly influenced by crosstalk due to the liquid crystal phase diffraction grating.

In the display of an image, when the rectangular pixel area is in a landscape (horizontally longer) state which is long in the x direction, in the pixel electrode which is formed in units of sub-pixels, the strip-shaped part is formed to extend in the longitudinal direction of the rectangular pixel area as in the configuration of the related art, and thus the extending direction of the strip-shaped part is perpendicular to the opening direction of the parallax barrier.

Figure 6:
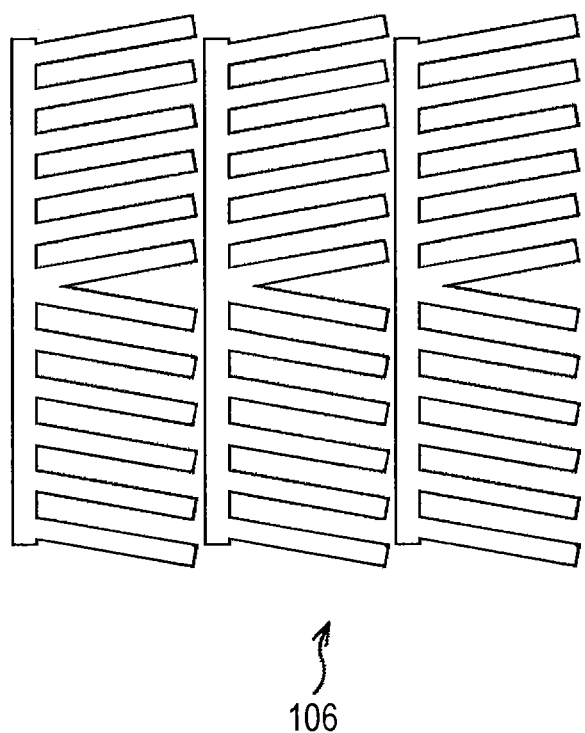
FIG. 6 is a diagram illustrating the shape of a pixel electrode.

In addition, FIG. 5 shows a configuration in which the extending direction of the strip-shaped parts of the pixel electrode 106 is perpendicular to the opening direction of the parallax barrier, that is, parallel to the parallax direction. However, for example, as shown in FIG. 6, the strip-shaped parts may be extended in a direction (in the drawing, transverse direction) slightly different from the parallax direction on the upper and lower sides of the pixel electrode 106 to achieve a dual domain.

Furthermore, in the above description, although the sub-pixels are arranged in stripes, the sub-pixels may be arranged in a mosaic arrangement pattern in which the sub-pixels are arranged in grids.

Figure 7:
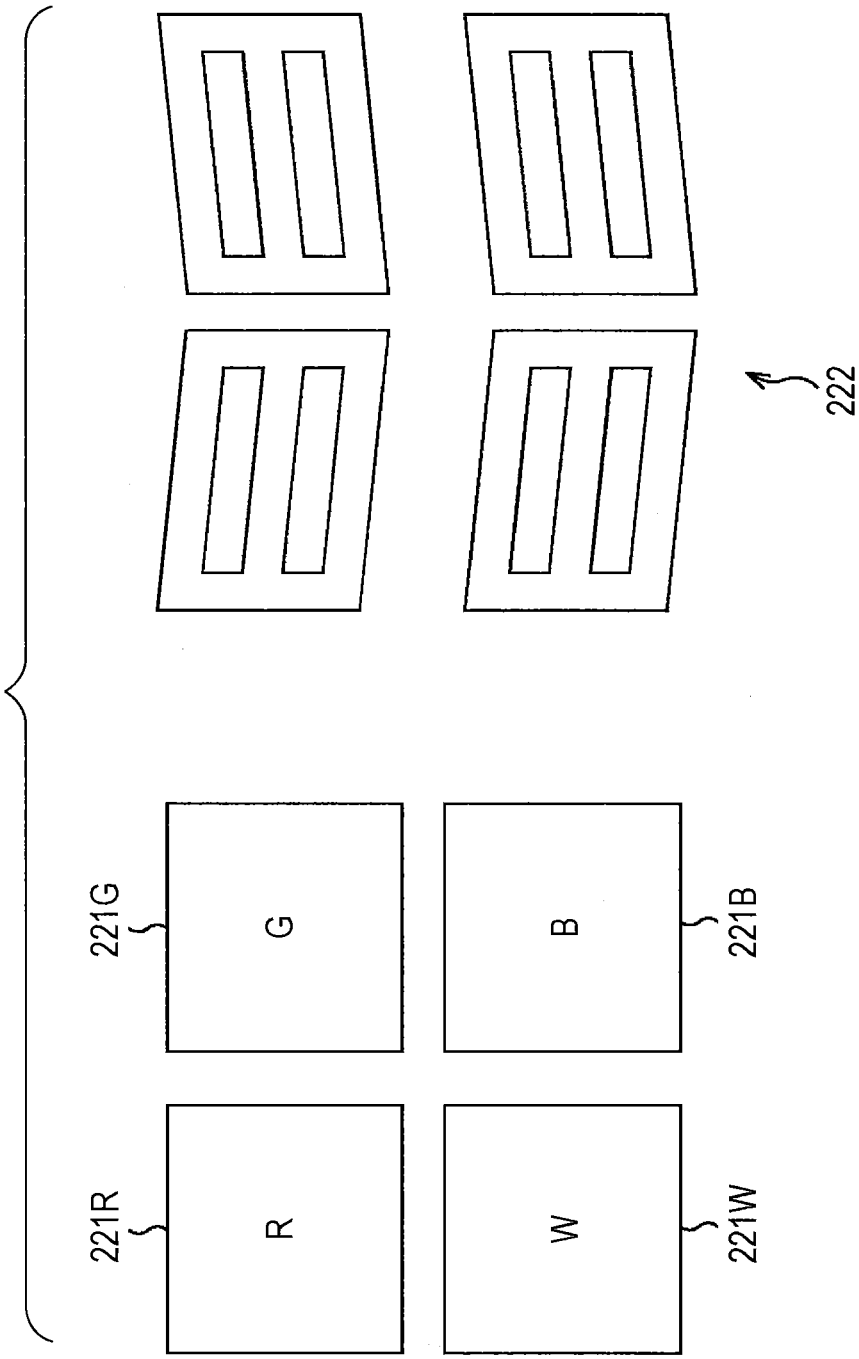
FIG. 7 is a diagram illustrating the shape of a pixel electrode.

That is, as shown in the left part of FIG. 7, a color filter has a color filter 221R which transmits only red (R) light rays, a color filter 221G which transmits only green (G) light rays, a color filter 221B which transmits only blue (B) light rays, and a color filter 221W which transmits all color light rays. In this case, as shown in the right part of FIG. 7, a pixel electrode 222 is formed in units of sub-pixels, has a plurality of strip-shaped parts which are arranged with intervals therebetween, and the extending direction of the strip-shaped parts is substantially perpendicular to the slit direction of the parallax barrier. That is, the strip-shaped part is formed parallel to the parallax direction.

In addition, in the above description, the pixel electrode having the above-described shape is applied to an optical modulation panel (liquid crystal display panel) which performs display in FFS mode. However, it can also be applied to an optical modulation panel which performs display in Vertical Alignment (VA) mode in which liquid crystal molecules are aligned perpendicular to the screen when no voltage is applied to the pixel electrode.

2. Second Embodiment

Figure 8:
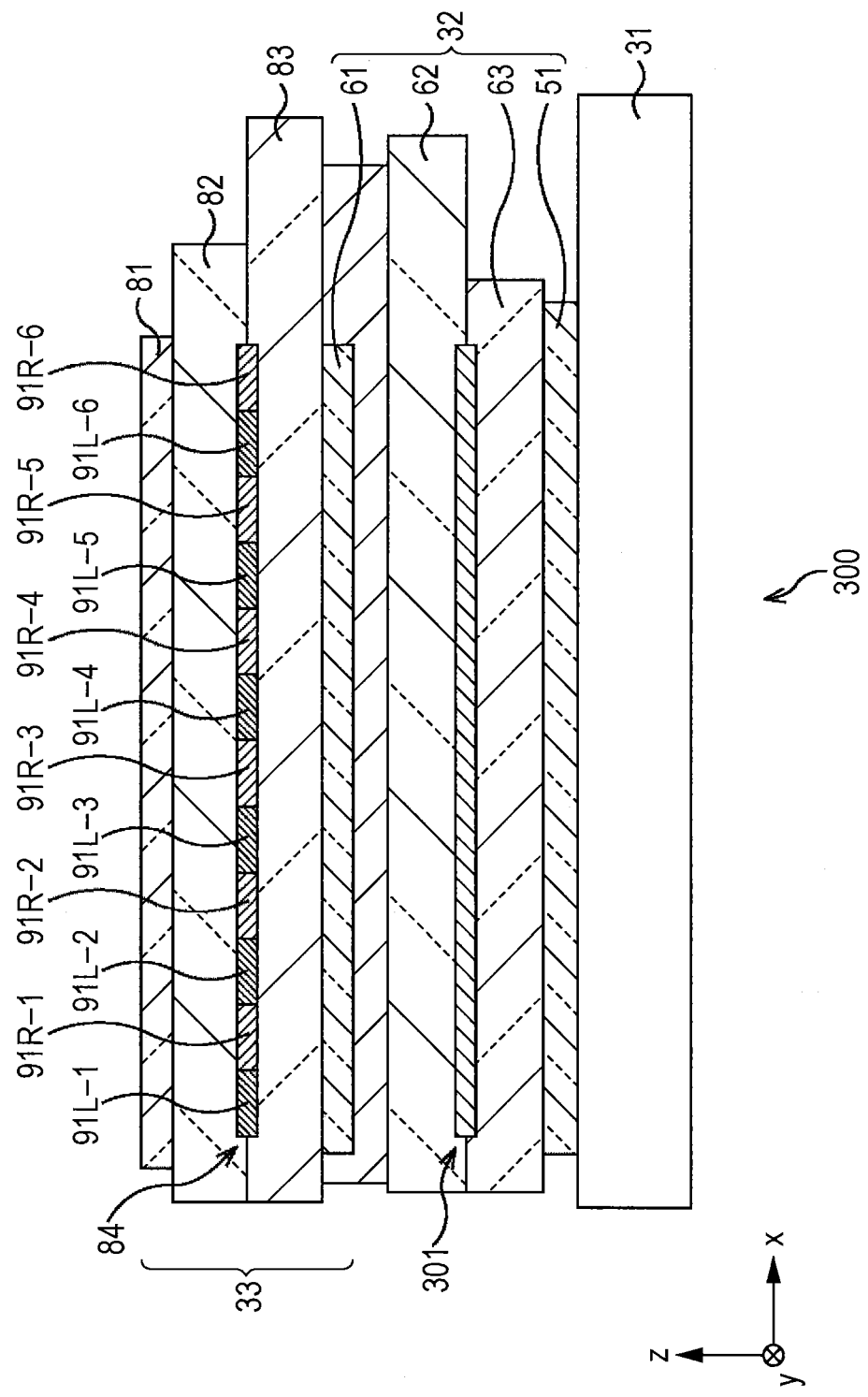
FIG. 8 is a diagram showing another example of the configuration of the display section.

FIG. 8 is a diagram showing another example of the configuration of the display section.

In a display section 300 of FIG. 8, parts corresponding to the parts in the display section 21 of FIG. 2 will be denoted by the same reference symbols, and descriptions thereof will be appropriately omitted.

That is, the display section 300 of FIG. 8 is different from the display section 21 of FIG. 2 in that a switch liquid crystal layer 301 is provided in place of the switch liquid crystal layer 64 of the parallax barrier 32. In the display section 300 shown in FIG. 8, a parallax barrier 32 is disposed between a backlight 31 and an optical modulation panel 33.

In the switch liquid crystal layer 301, a parallax barrier formed of slit areas and light-shielding areas is formed by a parallax barrier driving section 23. Particularly, in the switch liquid crystal layer 301, the slit areas and the light-shielding areas in the parallax barrier are moved in accordance with the position of the head of an observer by the parallax barrier driving section 23.

Electrode which Forms Parallax Barrier

Figure 9:
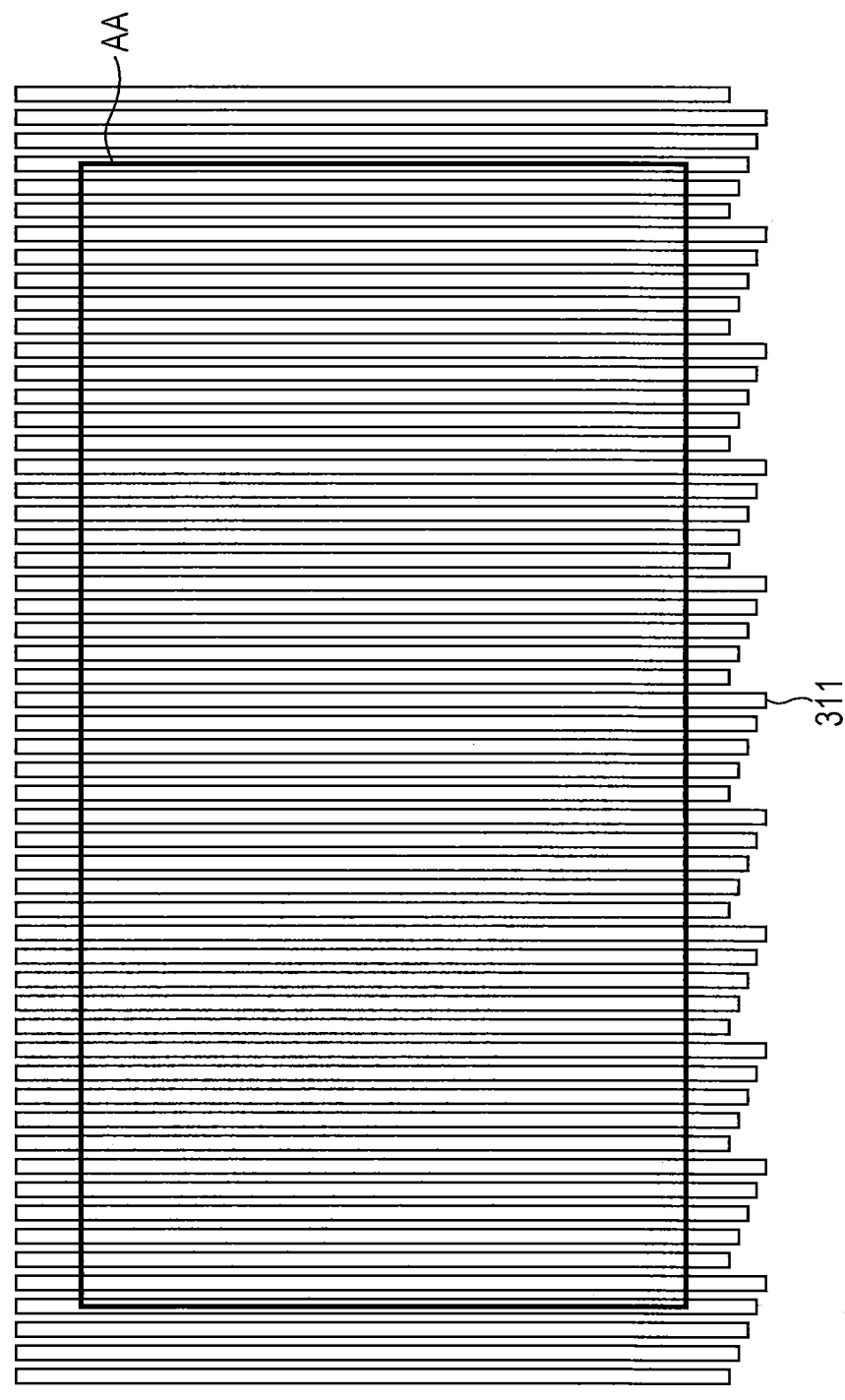
FIG. 9 is a diagram illustrating an electrode which forms a parallax barrier.

FIG. 9 shows the configuration of an electrode which is formed on the surfaces of a transparent substrate 62 and a transparent substrate 63 on the side of the switch liquid crystal layer 301 in the parallax barrier 32 of FIG. 8.

As shown in FIG. 9, an electrode 311 is formed on the surfaces of the transparent electrode 62 and the transparent electrode 63 on the side of the switch liquid crystal layer 301. In FIG. 9, an area AA represents an area corresponding to an active area of the display area of the display section 300.

The parallax barrier driving section 23 applies a voltage to the electrode 311 on the basis of the position of the head of the observer. Accordingly, in the switch liquid crystal layer 301, a stripe parallax barrier (light-shielding areas and slit areas) is formed to extend in the y direction, and the light-shielding areas and the slit areas are moved (shifted) in accordance with the position of the head of the observer.

Here, the operation of the parallax barrier which is shifted in accordance with the position of the observer will be described.

Figure 10:
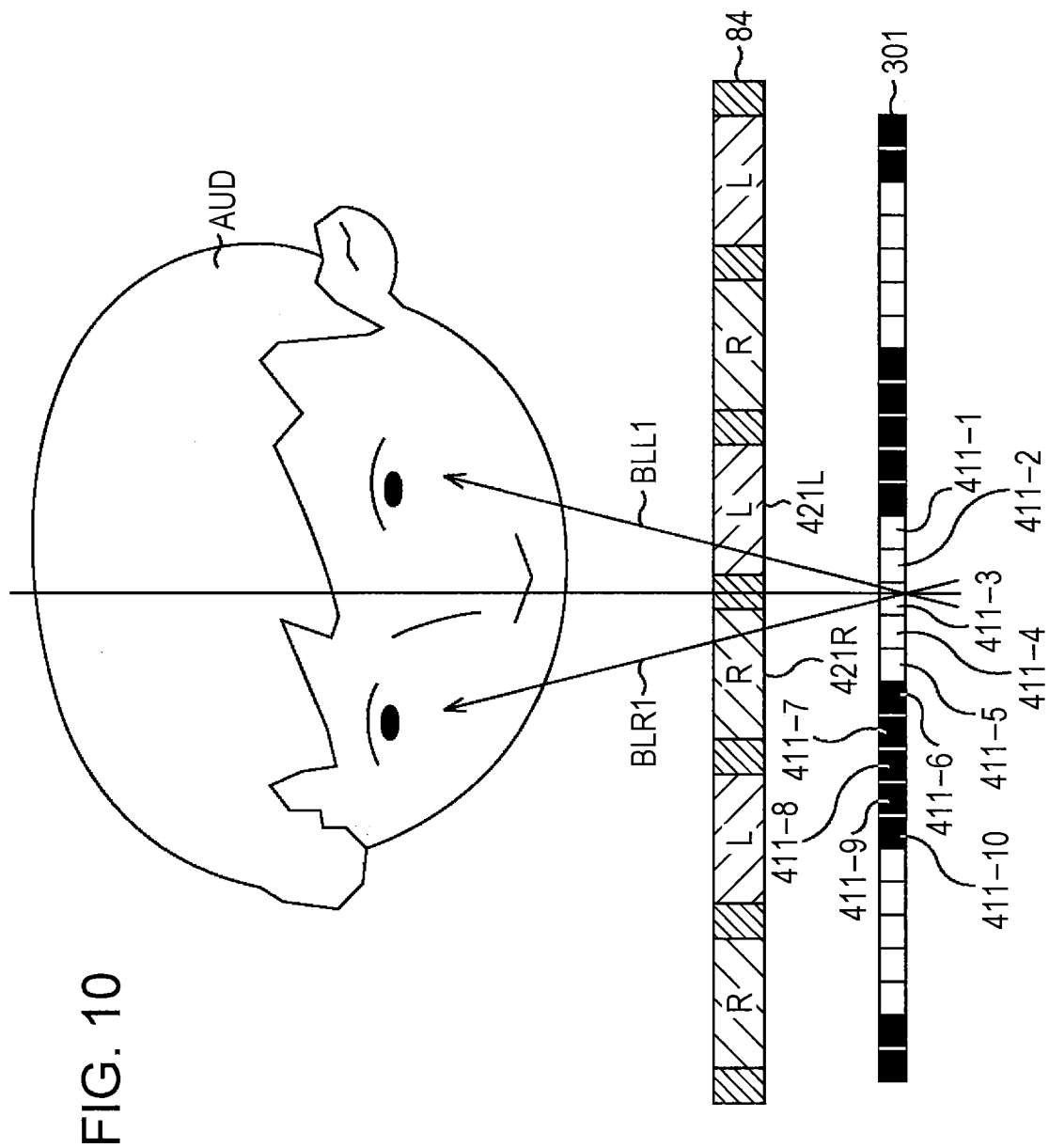
FIG. 10 is a diagram illustrating the shifting of the parallax barrier.

FIG. 10 shows the position of the head of an observer AUD at a predetermined time and states of the switch liquid crystal layer 301 and a liquid crystal layer 84.

In FIG. 10, each of the squares in the switch liquid crystal layer 301 is an area which is formed by the electrode 311. The white area represents a slit area, and the black area represents a light-shielding area. In FIG. 10, areas 411-1 to 411-5 are referred to as slit areas, and areas 411-6 to 411-10 are referred to as light-shielding areas.

In addition, each of the squares in the liquid crystal layer 84 is a part corresponding to each pixel. The part with a letter "R" represents a transmitting section which transmits light rays for displaying a right eye image, and the part with a letter "L" represents a transmitting section which transmits light rays for displaying a left eye image. In FIG. 10, a light ray BLR1 from the backlight 31 (not shown) passes through the area 411-3 and the transmitting section 421R and is incident on the right eye of the observer AUD, and a light ray BLL1 from the backlight 31 (not shown) passes through the area 411-3 and the transmitting section 421L and is incident on the left eye of the observer AUD.

Figure 11:
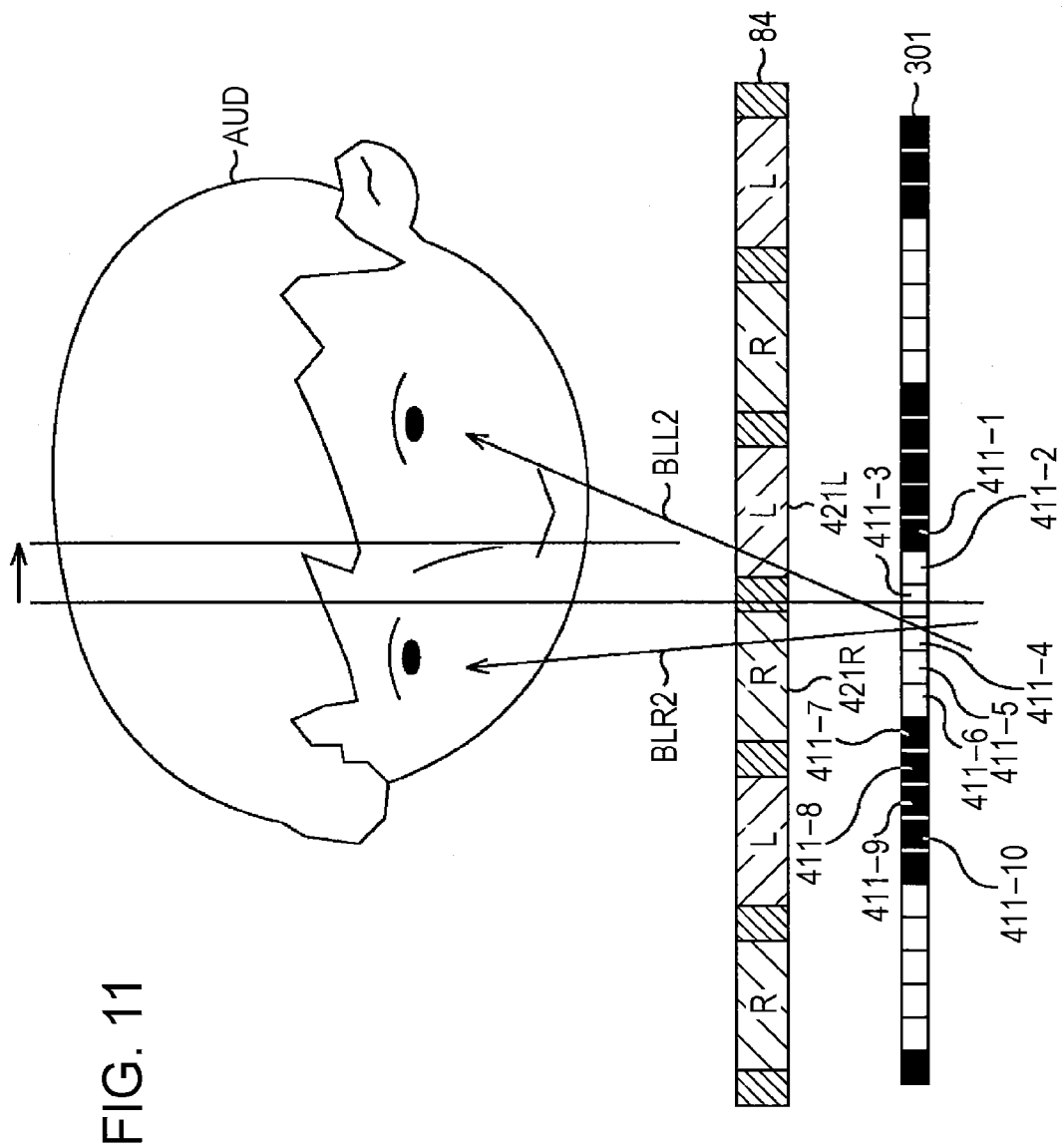
FIG. 11 is a diagram illustrating the shifting of the parallax barrier.

When the observer AUD moves to the right side in the drawing from the state shown in FIG. 10, the areas 411-2 to 411-6 become slit areas, and the areas 411-1 and 411-7 to 411-10 become light-shielding areas as shown in FIG. 11. That is, the positions of the light-shielding areas and the slit areas are shifted in accordance with the position of the head of the observer AUD. Accordingly, in FIG. 11, a light ray BLR2 from the backlight 31 (not shown) passes through the area 411-4 and the transmitting section 421R and is incident on the right eye of the observer AUD, and a light ray BLL2 from the backlight 31 (not shown) passes through the area 411-4 and the transmitting section 421L and is incident on the left eye of the observer AUD.

In this manner, even when the observer AUD moves, the observer AUD can continuously observe (view) an image corresponding to the transmitting sections 421R and 421L.

In this embodiment, in the display of an image, the rectangular pixel area is in a landscape (horizontally longer) state which is long in the x direction, and in the pixel electrode which is formed in units of sub-pixels, the strip-shaped part is formed in the longitudinal direction (x direction) of the rectangular pixel area as in the configuration of the related art (FIG. 4). That is, the extending direction of the strip-shaped part of the pixel electrode is perpendicular to the opening direction of the parallax barrier.

In addition, in the configuration in which the positions of the light-shielding areas and the slit areas in the parallax barrier are shifted in accordance with the position of the head of the observer, the interval (slit pitch) between the slits is designed to be very small, and there is concern that the parallax barrier itself acts as a diffraction grating.

However, since the parallax barrier 32 is disposed closer to the backlight 31 than the optical modulation panel 33 as shown in FIG. 8, it is possible to suppress the influence of the diffraction of the parallax barrier on an image to be finally displayed and to suppress crosstalk from occurring in the display of a 3D image, as compared to the case in which the optical modulation panel 33 is disposed closer to the backlight 31.

3. Examples of Application to Electronic Apparatus

Next, examples of the application of the 3D image display device described in the above-described embodiments will be described with reference to FIGS. 12 to 15 and 16A to 16F. The 3D image display device according to the above-described embodiments can be applied to electronic devices of any field such as TV devices, digital cameras, note-type personal computers, portable terminal devices such as cell phones, and video cameras. In other words, the 3D image display device according to the above-described embodiments can be applied to all fields of electronic apparatuses which display an image signal input from the outside or an image signal generated internally as an image.

Application Example 1

Figure 12:
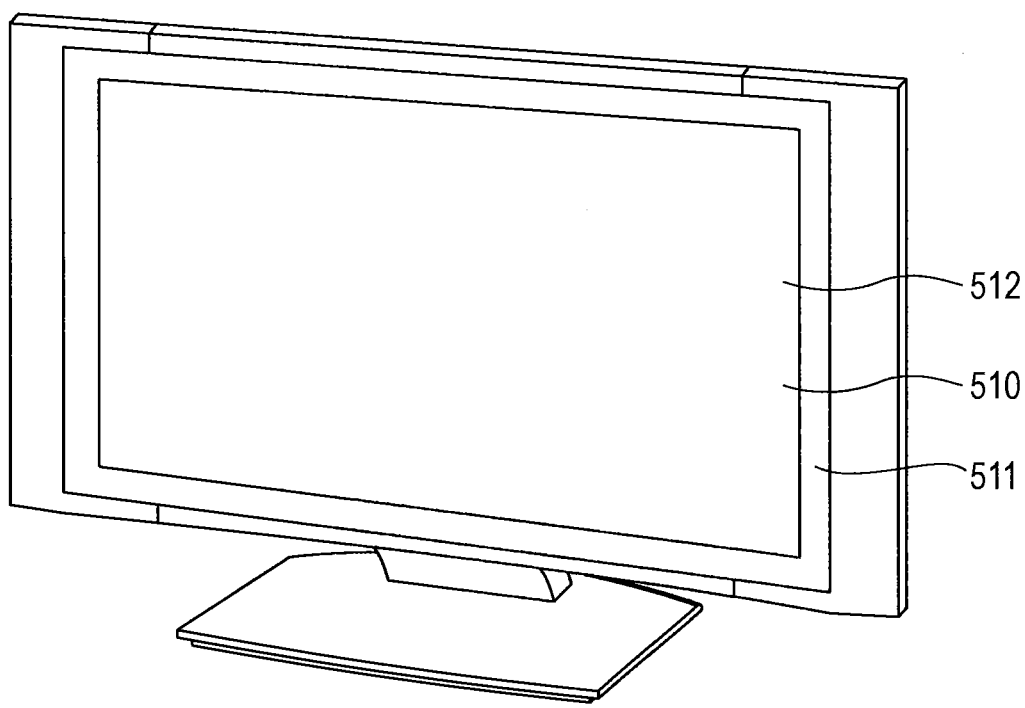
FIG. 12 is a diagram illustrating an example of the application to an electronic apparatus of the present disclosure.

FIG. 12 shows the appearance of a TV device to which the 3D image display device according to the above-described embodiments is applied. The TV device has, for example, a video display screen section 510 including a front panel 511 and a filter glass 512, and the video display screen section 510 is constituted of the display section of the 3D image display device according to the above-described embodiments.

Application Example 2

Figure 13A:
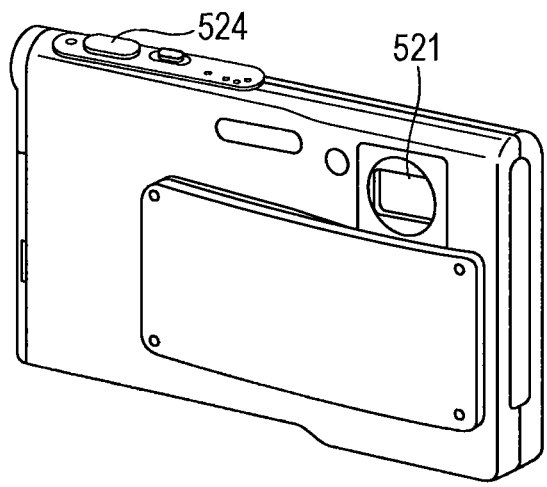
FIGS. 13A and 13B are diagrams illustrating an example of the application to an electronic apparatus of the present disclosure.
Figure 13B:
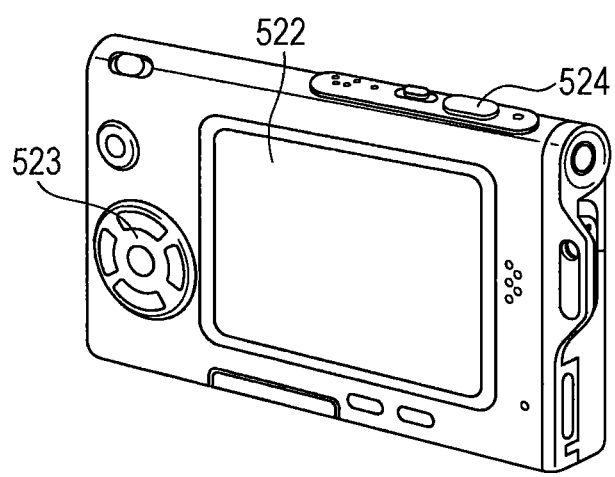

FIGS. 13A and 13B show the appearance of a digital camera to which the 3D image display device according to the above-described embodiments is applied. The digital camera has, for example, a light-emitting section 521 for a flash, a display section 522, a menu switch 523, and a shutter button 524, and the display section 522 is constituted of the display section of the 3D image display device according to the above-described embodiments.

Application Example 3

Figure 14:
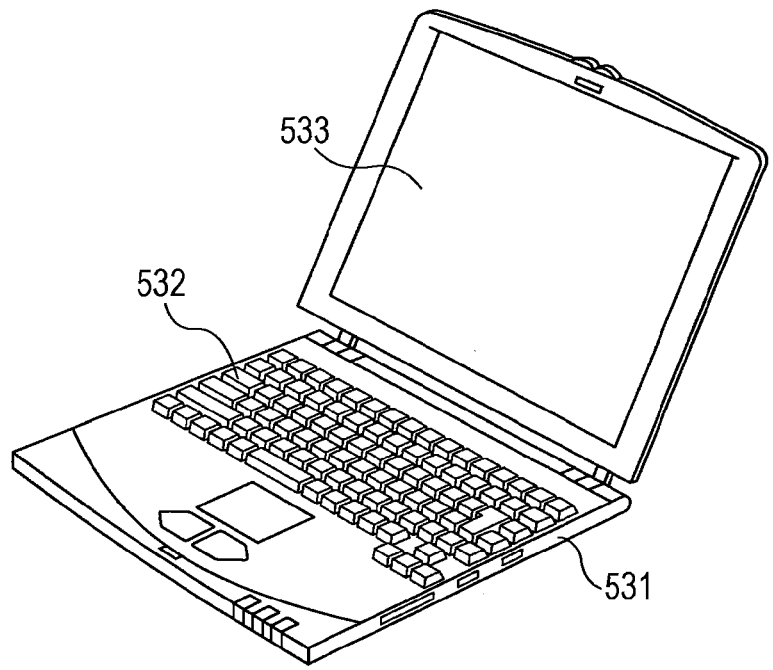
FIG. 14 is a diagram illustrating an example of the application to an electronic apparatus of the present disclosure.

FIG. 14 shows the appearance of a note-type personal computer to which the 3D image display device according to the above-described embodiments is applied. The note-type personal computer has, for example, a main body 531, a keyboard 532 for inputting letters and the like, and a display section 533 which displays an image, and the display section 533 is constituted of the display section of the 3D image display device according to the above-described embodiments.

Application Example 4

Figure 15:
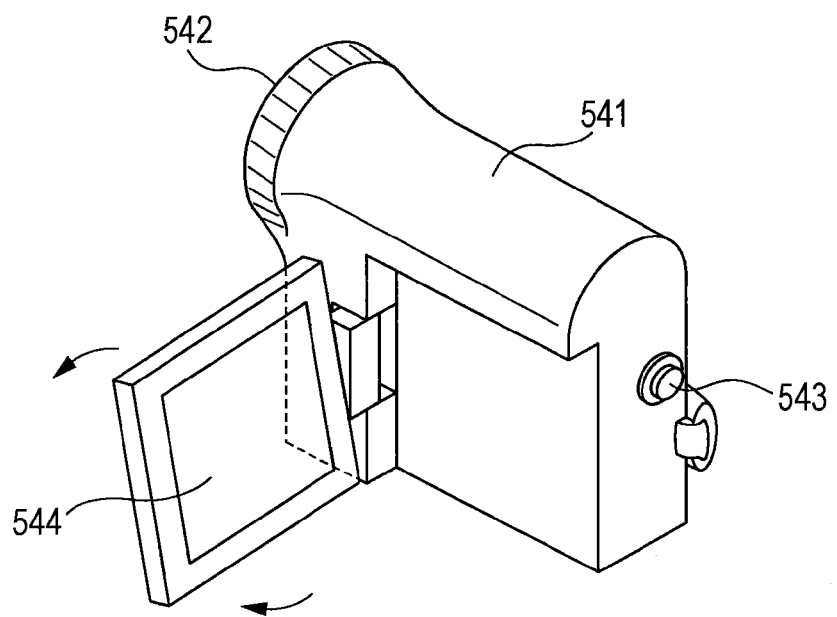
FIG. 15 is a diagram illustrating an example of the application to an electronic apparatus of the present disclosure.

FIG. 15 shows the appearance of a video camera to which the 3D image display device according to the above-described embodiments is applied. The video camera has, for example, a main body section 541, a lens 542 for photographing an object which is provided on the front side surface of the main body section 541, a start/stop switch 543 used when filming, and a display section 544, and the display section 544 is constituted of the display section of the 3D image display device according to the above-described embodiments.

Application Example 5

FIGS. 16A to 16F show the appearance of a cell phone to which the 3D image display device according to the above-described embodiments is applied. The cell phone has, for example, a configuration in which a connecting section (hinge section) 730 connects an upper housing 710 to a lower housing 720, and has a display 740, a sub-display 750, a picture light 760, and a camera 770. The display 740 or the sub-display 750 is constituted of the display section of the 3D image display device according to the above-described embodiments.

In the above description, the 3D image display device according to the above-described embodiments provides a 3D image to an observer by displaying images for two points of view. However, the present disclosure is not limited to the 3D image, and a plurality of images differing according to the point of view, that is, images for multiple points of view may be provided. Specifically, for example, the present disclosure may be applied to a car navigation system in which differing images are viewed from the driver's seat and from the passenger's seat of a car.

In addition, the embodiments of the present disclosure are not limited to the above-described embodiments, and various modifications can be made without departing from the gist of the present disclosure.

The present disclosure contains subject matter related to that disclosed in Japanese Priority Patent Application JP 2011-271941 filed in the Japan Patent Office on Dec. 13, 2011, the entire contents of which are hereby incorporated by reference.

What is claimed is:

1. A liquid crystal display device comprising:
    a liquid crystal panel which displays a left eye image and a right eye image; and
    a light-shielding barrier which has a slit section and a light-shielding section to cause binocular parallax,
    wherein the liquid crystal panel include
        a first substrate which has a pixel electrode formed thereon,
        a second substrate which is separated from and opposed to the surface of the first substrate which has the pixel electrode formed thereon, and
        a liquid crystal layer which is disposed between the first substrate and the second substrate,
    the pixel electrode has a plurality of strip-shaped parts which are arranged with intervals therebetween, and
    an extending direction of the strip-shaped parts is substantially perpendicular to an opening direction of the slit section.

2. The liquid crystal display device according to claim 1, wherein in the display of an image, when a rectangular pixel area is vertically longer, the strip-shaped parts of the pixel electrode extend in a transverse direction of the rectangular shape.

3. The liquid crystal display device according to claim 1, further comprising:
    a barrier driving section which forms the stripe slit section and the stripe light-shielding section in the light-shielding barrier, and drives the light-shielding barrier to move the position of the light-shielding section in the light-shielding barrier in accordance with the position of an observer; and
    a backlight which makes light rays for displaying the left eye image and the right eye image incident on the liquid crystal panel,
    wherein the light-shielding barrier is disposed between the liquid crystal panel and the backlight.

4. The liquid crystal display device according to claim 3, wherein in the display of an image, the rectangular pixel area is horizontally longer, and
    the strip-shaped parts of the pixel electrode extend in a longitudinal direction of the rectangular shape.

5. An electronic apparatus comprising:
    a liquid crystal display device which performs display on the basis of an image signal; and
    a processor which generates the image signal through a predetermined process,
    wherein the liquid crystal display device includes
        a liquid crystal panel which displays a left eye image and a right eye image, and
        a light-shielding barrier which has a slit section and a light-shielding section to cause binocular parallax,
        the liquid crystal panel includes
            a first substrate which has a pixel electrode formed thereon,
            a second substrate which is separated from and opposed to the surface of the first substrate which has the pixel electrode formed thereon, and
            a liquid crystal layer which is disposed between the first substrate and the second substrate,
        the pixel electrode has a plurality of strip-shaped parts which are arranged with intervals therebetween, and
        an extending direction of the strip-shaped parts is substantially perpendicular to an opening direction of the slit section.

* * * * *